(12) United States Patent
Oshita et al.

(10) Patent No.: US 10,920,698 B2
(45) Date of Patent: Feb. 16, 2021

(54) FUEL-SAVING CONTROL DEVICE AND FUEL-SAVING CONTROL METHOD

(71) Applicant: ISUZU MOTORS LIMITED, Tokyo (JP)

(72) Inventors: Wasantha Oshita, Fujisawa (JP); Tomohiko Takeda, Machida (JP); Katsunori Kikuchi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/341,408

(22) PCT Filed: Oct. 12, 2017

(86) PCT No.: PCT/JP2017/036903
§ 371 (c)(1),
(2) Date: Apr. 11, 2019

(87) PCT Pub. No.: WO2018/070452
PCT Pub. Date: Apr. 19, 2018

(65) Prior Publication Data
US 2020/0040833 A1 Feb. 6, 2020

(30) Foreign Application Priority Data
Oct. 12, 2016 (JP) .............................. JP2016-200900

(51) Int. Cl.
*F02D 41/12* (2006.01)
*B60W 10/06* (2006.01)
*B60W 30/182* (2020.01)

(52) U.S. Cl.
CPC ............ *F02D 41/123* (2013.01); *B60W 10/06* (2013.01); *B60W 30/182* (2013.01); *B60W 2540/10* (2013.01)

(58) Field of Classification Search
CPC .. F02D 41/123; F02D 41/1497; F02D 11/105; F02D 2200/602; F02D 2200/701;
(Continued)

(56) References Cited

U.S. PATENT DOCUMENTS

2003/0173125 A1* 9/2003 Ishikawa ............ B60L 15/2009
180/65.26
2010/0191434 A1* 7/2010 Fujita ................... B60W 30/188
701/91
(Continued)

FOREIGN PATENT DOCUMENTS

DE 112012007222 T5 9/2015
JP 2000-293782 A 10/2000
(Continued)

OTHER PUBLICATIONS

European Search Report for related International Application No. EP-EPSR 17861049.9, dated Sep. 11, 2019; 11 pages.
(Continued)

*Primary Examiner* — Joseph J Dallo
(74) *Attorney, Agent, or Firm* — Procopio, Cory, Hargreaves & Savitch LLP

(57) ABSTRACT

A fuel-saving control device (100) equipped with: a surplus drive force calculation unit (101) for calculating surplus drive force; a fuel-saving control unit (102) for executing a fuel-saving control which lowers and corrects the indicated fuel injection amount according to the accelerator position when the surplus drive force reaches or exceeds a threshold, and stopping the fuel-saving control when the surplus drive force falls below the threshold; a direction indicator operation detection unit (107) for detecting operation of a direction indicator; a vehicle position detection unit (108) for detecting the vehicle position; a map information storage unit (109) for storing map information; and a fuel-saving control stoppage condition determination unit (110) for (Continued)

determining whether or not a fuel-saving control should be stopped, on the basis of the map information and the vehicle position when the direction indicator operation is detected. When determined that the fuel-saving control should be stopped, the fuel-saving control unit (102) stops the fuel-saving control even if the surplus drive force does not fall below the threshold.

4 Claims, 3 Drawing Sheets

(58) Field of Classification Search
CPC .... F02D 2200/702; F02D 29/02; F02D 41/04; F02D 45/00; B60W 10/06; B60W 30/182; B60W 2540/10
See application file for complete search history.

(56) References Cited

U.S. PATENT DOCUMENTS

| | | | |
|---|---|---|---|
| 2012/0209462 A1* | 8/2012 | Roos | B60W 10/26 701/22 |
| 2013/0103238 A1* | 4/2013 | Yu | B60W 20/12 701/22 |
| 2015/0315991 A1* | 11/2015 | Miura | F02D 29/02 701/48 |
| 2016/0318514 A1* | 11/2016 | Kuwahara | B60W 30/18136 |
| 2017/0298849 A1* | 10/2017 | Be | F02N 11/0814 |

FOREIGN PATENT DOCUMENTS

| | | |
|---|---|---|
| JP | 2008-115814 A | 5/2008 |
| JP | 2011-099394 A | 5/2011 |
| JP | 2011-173586 A | 9/2011 |
| JP | 2011-196346 A | 10/2011 |
| JP | 2012-002194 A | 1/2012 |
| JP | 2012-002195 A | 1/2012 |
| JP | 2012-076700 A | 4/2012 |
| JP | 2016-061177 A | 4/2016 |
| JP | 2016-094883 A | 5/2016 |

OTHER PUBLICATIONS

International Search Report and Written Opinion for related International Application No. PCT/JP2017/036903, dated Dec. 26, 2017; English translation of ISR provided; 9 pages.

* cited by examiner

FUEL-SAVING CONTROL DEVICE AND FUEL-SAVING CONTROL METHOD

TECHNICAL FIELD

The present disclosure relates to a fuel-saving control device and a fuel-saving control method.

BACKGROUND ART

A fuel-saving control is widely known, in which, while a vehicle is traveling with an instructed fuel injection amount depending on an accelerator position, the instructed fuel injection amount depending on the accelerator position is intentionally lowered and corrected by using a lowering correction value depending on a surplus driving force when a surplus driving force becomes equal to or greater than a threshold value, thereby reducing an actual fuel consumption of an engine (e.g., see PTL 1). By executing the fuel-saving control, an accelerating force of the vehicle (a force required for accelerating the vehicle) is limited. However, when the surplus driving force becomes smaller than the threshold value or a kickdown operation by a driver (an operation in which the driver suddenly and deeply steps an accelerator pedal) is detected, the fuel-saving control is stopped. As a result, a driver is hardly influenced by the limited accelerating force of the vehicle, and convenience of the driver is prevented from being greatly impaired due to execution of the fuel-saving control.

In addition to PTL 1, examples of the related art related to such a fuel-saving control device are also disclosed in PTL 2.

CITATION LIST

Patent Literature

[PTL 1] JP-A-2016-061177
[PTL 2] JP-A-2012-076700

SUMMARY OF INVENTION

Technical Problem

As a situation where the driver desires to increase an accelerating force of the vehicle, namely, a situation where there is a possibility that the driver performs a kickdown operation, for example, a case where the vehicle is decelerated in an intersection and then accelerated after turning right or left, a case where, during travelling on a multi-lane expressway, the vehicle is accelerated after changing a lane in order to pass a preceding vehicle, a case where the vehicle is accelerated in an acceleration lane in order to join in a main lane of the expressway, and the like can be considered, in addition to the case where the surplus driving force becomes smaller than the threshold value.

However, there are also quite a few drivers who are reluctant to perform a kickdown operation in normal times, not in emergency situations. Also, in order to perform the kickdown operation, the driver suddenly and deeply (fully) has to step the accelerator pedal. Accordingly, the driver may worry about rapid acceleration of the vehicle and thus dislike to perform the kickdown operation itself.

Therefore, conventionally, when a direction indicating operation is detected, the fuel-saving control is unconditionally stopped even if the surplus driving force does not become smaller than the threshold value, namely, even if the surplus driving force is equal to or greater than the threshold value. Herein, it is assumed that the time when the direction indicating operation is detected refers to the situation in the intersection or on the expressway as described above.

Since the fuel-saving control is stopped on condition of the direction indicating operation, the fuel-saving control is stopped even if the fuel-saving control should not be stopped (e.g., when changing a lane on a local road or joining on a local road).

As a result, a fuel-saving performance of the vehicle may be decreased and also a change in vehicle behavior, which is not intended by the driver, may be caused. Accordingly, the convenience and safety of the driver may be impaired.

Accordingly, an object of the present disclosure is to provide a fuel-saving control device and a fuel-saving control method, in which when a fuel-saving control should not be stopped, the fuel-saving control is not unconditionally stopped even if a direction indicating operation has been detected, thereby improving convenience and safety of a driver while maintaining a fuel-saving performance of a vehicle.

Solution to Problem

In a first aspect of the present disclosure, there is provided a fuel-saving control device, including: a surplus driving force calculation unit for calculating a surplus driving force; a fuel-saving control unit configured to execute a fuel-saving control for lowering and correcting an instructed fuel injection amount depending on an accelerator position when the surplus driving force becomes equal to or greater than a threshold value, and configured to stop the fuel-saving control when the surplus driving force becomes smaller than the threshold value, a direction indicating operation detection unit for detecting a direction indicating operation; a vehicle position detection unit for detecting a vehicle position; a map information storage unit for storing map information; and a fuel-saving control stop condition determination unit for determining whether the fuel-saving control should be stopped based on the vehicle position and the map information when the direction indicating operation is detected, and the fuel-saving control unit is configured to stop the fuel-saving control even if the surplus driving force does not become smaller than the threshold value, when the fuel-saving control stop condition determination unit determines that the fuel-saving control should be stopped, and is configured not to stop the fuel-saving control when the fuel-saving control stop condition determination unit determines that the fuel-saving control should not be stopped.

The fuel-saving control stop condition determination unit may be configured to determine that the fuel-saving control should be stopped when turning right or left at an intersection, when passing on an expressway, or when joining on an expressway.

In a second aspect of the present disclosure, there is provided a fuel-saving control method, including: a surplus driving force calculation step for calculating a surplus driving force; a fuel-saving control execution step for executing a fuel-saving control for lowering and correcting an instructed fuel injection amount depending on an accelerator position when the surplus driving force becomes equal to or greater than a threshold value; a fuel-saving control stop step for stopping the fuel-saving control when the surplus driving force becomes smaller than the threshold value, a vehicle position detection step for detecting a vehicle position; a fuel-saving control stop condition determination step for determining whether the fuel-saving control should be stopped based on the vehicle position and map information when a direction indicating operation is detected; and a second fuel-saving control stop step for stopping the fuel-saving control even if the surplus driving force does not become smaller than the threshold value, when it is determined that the fuel-saving control should be stopped in the fuel-saving control stop condition determination step, and for not stopping the fuel-saving control when it is determined that the fuel-saving control should not be stopped in the fuel-saving control stop condition determination step.

In the fuel-saving control stop condition determination step, it may be determined that the fuel-saving control should be stopped when turning right or left at an intersection, when passing on an expressway, or when joining on an expressway.

Advantageous Effects of Invention

According to the present disclosure, the fuel-saving control device and the fuel-saving control method can be provided, in which when a fuel-saving control should not be stopped, the fuel-saving control is not unconditionally stopped even if a direction indicating operation has been detected, thereby improving convenience and safety of a driver while maintaining a fuel-saving performance of a vehicle.

DESCRIPTION OF EMBODIMENTS

Hereinafter, embodiments of the present disclosure will be described with reference to the accompanying drawings.

First, a fuel-saving control device will be described.

The fuel-saving control device is mounted on an automobile traveling by transferring a driving force of an engine to a driving wheel of a vehicle via a transmission (a manual transmission vehicle or an automatic transmission vehicle).

Figure 1:
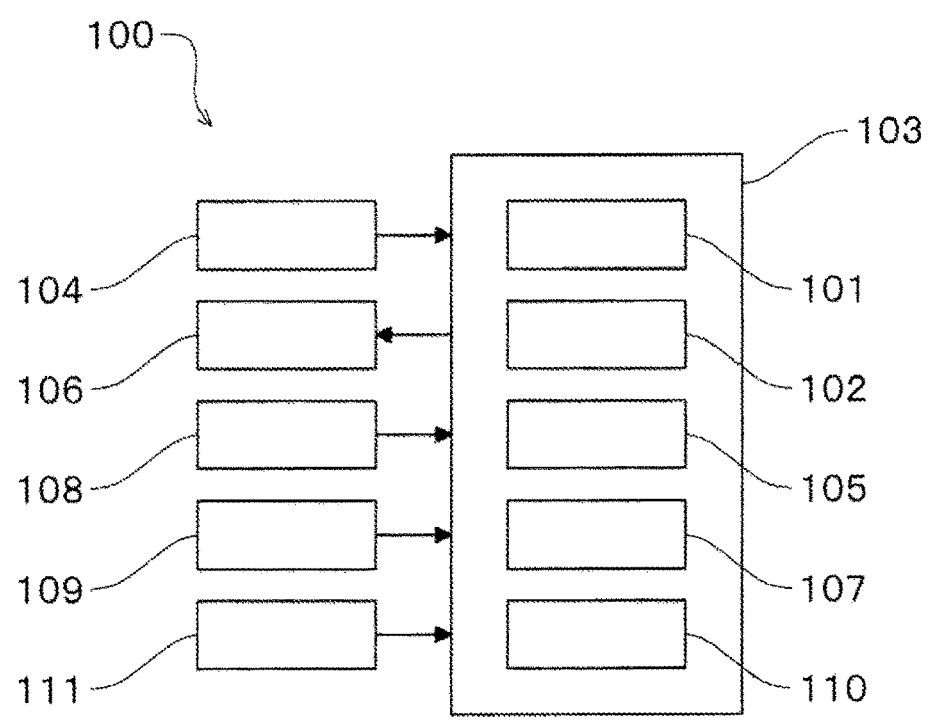
FIG. 1 is a configuration diagram of a fuel-saving control device according to an embodiment of the present disclosure.

As shown in FIG. 1, the fuel-saving control device 100 according to an embodiment of the present disclosure includes a surplus driving force calculation unit 101 for calculating a surplus driving force, and a fuel-saving control unit 102 for stopping a fuel-saving control when the surplus driving force becomes smaller than a threshold value.

Typically, a vehicle travels with an instructed fuel injection amount depending on an accelerator position by a driver. However, when a surplus driving force becomes equal to or greater than a threshold value, a fuel-saving control is executed for lowering and correcting the instructed fuel injection amount depending on the accelerator position.

The surplus driving force is defined by a difference between a driving force of the driving wheel and a traveling resistance on the vehicle. Also, stopping the fuel-saving control means that lowering and correcting the instructed fuel injection amount depending on the accelerator position is stopped and thus the control is returned to a normal control.

The surplus driving force calculation unit 101 is configured to calculate a surplus driving force by calculating a difference between the driving force of the driving wheel and a travelling resistance force on the vehicle. The fuel-saving control unit 102 is configured to reduce an actual fuel consumption of the engine and thus to limit an accelerating force of the vehicle by intentionally lowering and correcting an instructed fuel injection amount, which originally depends on the accelerator position by the driver, regardless of the accelerator position, when the surplus driving force becomes equal to or greater than the threshold value. Herein, limiting the accelerating force of the vehicle means limiting a torque of the engine, a power of the engine and/or an acceleration of the vehicle. A controller 103 gets all variables for controlling the engine with various instruments. For, the controller 103 gets an accelerator position with an accelerator position sensor 104. Also, the controller 103 is equipped with an instructed fuel injection amount calculation unit 105 for calculating an instructed fuel injection amount depending on the accelerator position, and is configured to control a fuel injector 106 for injecting fuel into a cylinder of the engine. The fuel injector 106 is configured to inject fuel into the cylinder of the engine in accordance with the instructed fuel injection amount depending on the accelerator position.

As a situation where the driver desires to increase an accelerating force of the vehicle, namely, a situation where there is a possibility that the driver performs a kickdown operation (an operation in which the driver suddenly and deeply steps an accelerator pedal), for example, a case where the vehicle is decelerated in an intersection and then accelerated after turning right or left, a case where, during travelling on a multi-lane expressway, the vehicle is accelerated after changing a lane in order to pass a preceding vehicle, a case where the vehicle is accelerated in an acceleration lane in order to join in a main lane of the expressway, and the like can be considered, in addition to the case where the surplus driving force becomes smaller than the threshold value.

However, there are also quite a few drivers who are reluctant to perform a kickdown operation in normal times, not in emergency situations.

Therefore, conventionally, when a direction indicating operation is detected, the fuel-saving control is unconditionally stopped even if the surplus driving force does not become smaller than the threshold value, namely, even if the surplus driving force is equal to or greater than the threshold value. Herein, it is assumed that the time when the direction indicating operation is detected refers to the situation in the intersection or on the expressway as described above.

Since the fuel-saving control is stopped on condition of the direction indicating operation, the fuel-saving control is stopped even if the fuel-saving control should not be stopped (e.g., when changing a lane on a local road or joining on a local road).

As a result, a fuel-saving performance of the vehicle may be decreased and a change in vehicle behavior, which is not intended by the driver, may be caused. Accordingly, the convenience and safety of the driver may be impaired.

Therefore, the fuel-saving control device 100 further includes a direction indicating operation detection unit 107 for detecting a direction indicating operation, a vehicle position detection unit 108 for detecting a vehicle position, a map information storage unit 109 for storing map information therein, and a fuel-saving control stop condition determination unit 110 for determining whether the fuel-saving control should be stopped based on the vehicle position and the map information when the direction indicating operation is detected. Herein, the direction indicating operation means operating a direction indicator 111 so that the driver intends to change a course. Also, the direction indicating operation is detected, for example, by grasping an operation of the direction indicator 111 via a car area network signal by the direction indicating operation detection unit 107. The vehicle position detection unit 108 is constituted, for example, by a global positioning system receiver. The map information storage unit 109 is constituted, for example, by a storage medium separate from the controller 103. The fuel-saving control stop condition determination unit 110 may be configured to determine that the fuel-saving control should be stopped in a case where the vehicle is decelerated in an intersection and then accelerated after turning right or left, a case where, during travelling on the multi-lane expressway, the vehicle is accelerated after changing the lane in order to pass the preceding vehicle, a case where the vehicle is accelerated in the acceleration lane in order to join in the main lane of the expressway, and the like, but configured to determine that the fuel-saving control should not be stopped, i.e., the fuel-saving control should be continued, when changing a lane on the local road or when joining on the local road.

The determination that the fuel-saving control should be stopped assumes the following situations.

For example, when the vehicle is positioned in or near the intersection and the direction indicating operation by the driver is detected, the vehicle will turn right or left at the intersection. Therefore, it can be determined that the fuel-saving control should be stopped.

Also, when the vehicle is travelling on the multi-lane expressway and a direction indicating operation by the driver is detected, the vehicle will perform passing on the expressway. Therefore, it can be determined that the fuel-saving control should be stopped.

Further, when the vehicle is travelling on the acceleration lane of the expressway and the direction indicating operation by the driver is detected, the vehicle will join in the main line of the expressway. Therefore, it can be determined that the fuel-saving control should be stopped.

Further, when the vehicle is travelling on a multi-lane local road and the direction indicating operation by the driver is detected, the vehicle will change a lane on the local road. Therefore, it can be determined that the fuel-saving control should not be stopped, i.e., the fuel-saving control should be continued.

Further, when the vehicle is stopped on the local and the direction indicating operation by the driver is detected, the vehicle will join in another local road from the general road. Therefore, it can be determined that the fuel-saving control should not be stopped, i.e., the fuel-saving control should be continued.

Herein, the expressway means not only original expressway, but also a motorway or a local road, on which flow is fast enough to be regarded as an expressway. Also, joining means not only a case where the vehicle joins in a main line via an acceleration lane on an expressway, but also a case where the vehicle returns to a travelling lane on a local road after temporarily stopping on a road shoulder or the like.

Meanwhile, situations, in which the fuel-saving control stop condition determination unit 110 determines that the fuel-saving control should be stopped, are not limited to a time when turning right or left at an intersection of a local road, when passing on an expressway or when joining on an expressway as described above, but include all situations, in which it is expected that limiting the accelerating force of the vehicle needs to be cancelled based on the vehicle position and the map information.

In the fuel-saving control device 100, the fuel-saving control unit 102 is configured to stop the fuel-saving control even if the surplus driving force does not become smaller than the threshold value, namely, even if the surplus driving force is equal to or greater than the threshold value, when it is determined that the fuel-saving control should be stopped, and is configured not to stop the fuel-saving control, namely, to continue the fuel-saving control when it is determined that the fuel-saving control should not be stopped. That is, the fuel-saving control unit 102 is configured to stop the fuel-saving control only when limiting the accelerating force of the vehicle needs to be cancelled, in response to the results determined by the fuel-saving control stop condition determination unit 110. Therefore, for example, at the time when changing a lane on a local road or when joining on a local road, at which limiting the accelerating force of the vehicle does not need to be cancelled, the fuel-saving control is not stopped, thereby improving the convenience and safety of the driver while maintaining the fuel-saving performance of the vehicle.

Next, a fuel-saving control method will be described.

Figure 2:
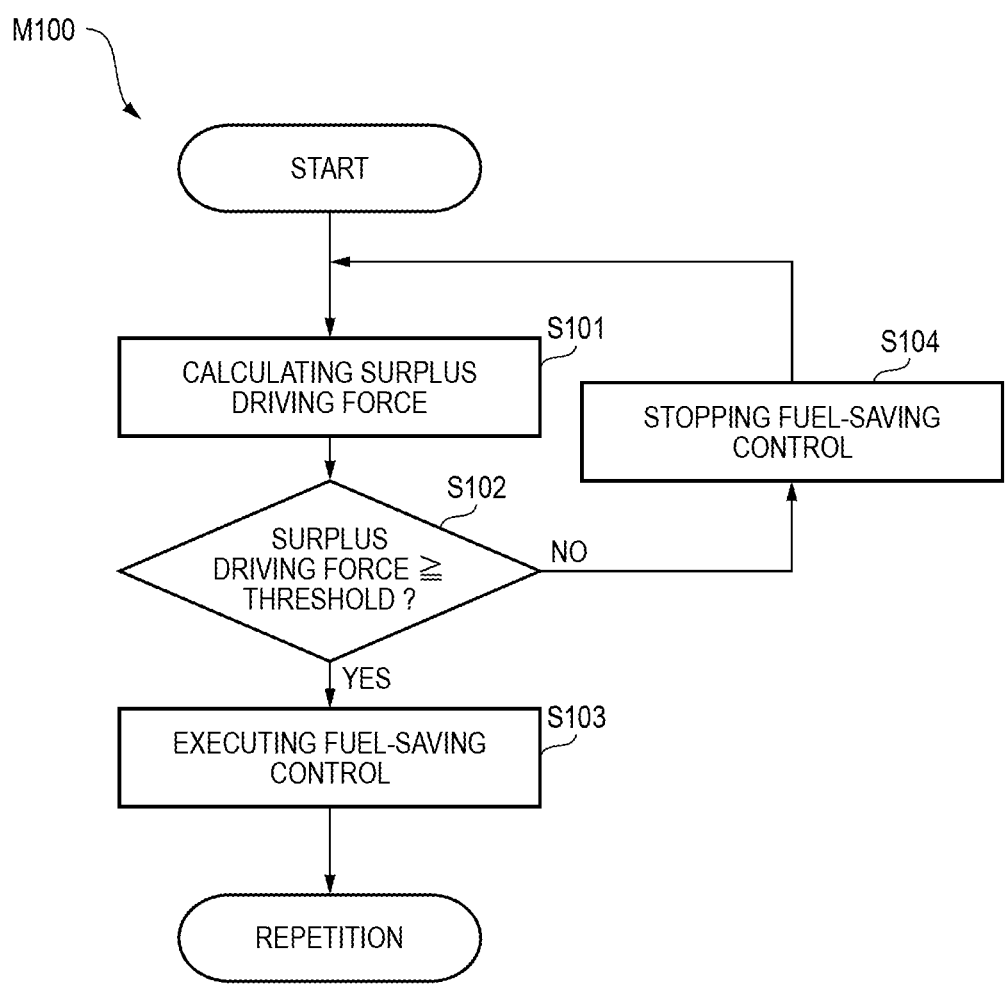
FIG. 2 is a flow chart of a basic fuel-saving control method of a fuel-saving control method according to an embodiment of the present disclosure.

As shown in FIG. 2, a fuel-saving control method according to an embodiment of the present disclosure includes a basic fuel-saving control method M100 to be executed by the fuel-saving control device 100 after an ignition key is turned on. The basic fuel-saving control method M100 includes a surplus driving force calculation step S101, a surplus driving force determination step S102, a fuel-saving control execution step S103, and a first fuel-saving control stop step S104.

In the surplus driving force calculation step S101, the surplus driving force calculation unit 101 calculates a surplus driving force. In the surplus driving force determination step S102, the fuel-saving control unit 102 determines whether the surplus driving force is equal to or greater than the threshold value. When the surplus driving force is equal to or greater than the threshold value, the method proceeds to the fuel-saving control execution step S103, whereas when the surplus driving force is smaller than the first threshold value, the method proceeds to the fuel-saving control stop step S104. In the fuel-saving control execution step S103, the fuel-saving control unit 102 executes a fuel-saving control for lowering and correcting an instructed fuel injection amount depending on an accelerator position. In the first fuel-saving control stop step S104, the fuel-saving control unit 102 stops the fuel-saving control.

Figure 3:
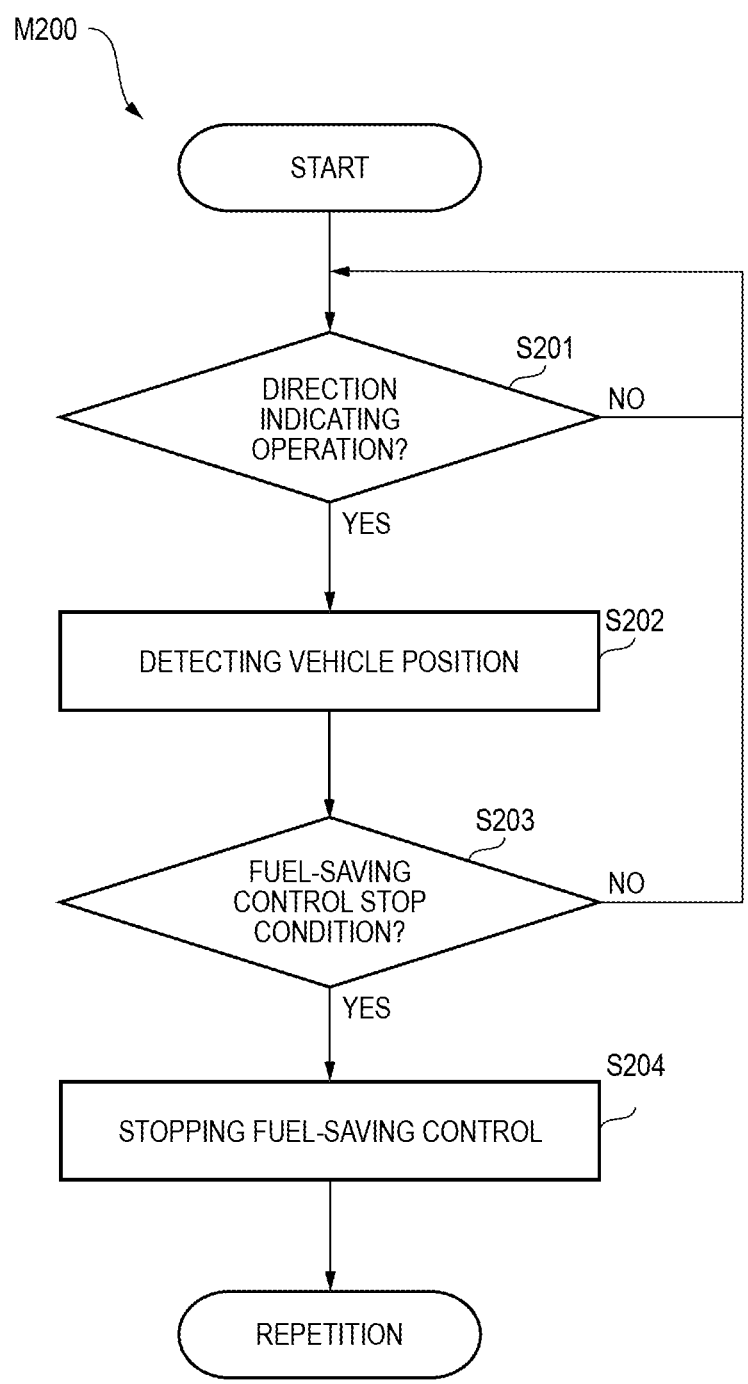
FIG. 3 is a flow chart of an extended fuel-saving control method of a fuel-saving control method according to an embodiment of the present disclosure.

Further, as shown in FIG. 3, the fuel-saving control method according to the embodiment of the present disclosure includes an extended fuel-saving control method M200 to be executed by the fuel-saving control device 100 after the ignition key is turned on. The extended fuel-saving control method M200 includes a direction indicating operation determination step S201, a vehicle position detection step S202, a fuel-saving control stop condition determination step S203, and a second fuel-saving control stop step S204.

In the direction indicating operation determination step S201, it is determined whether a direction indicating operation is detected by the direction indicating operation detection unit 107. When the direction indicating operation is detected, the method proceeds to the vehicle position detection step S202, whereas when the direction indicating operation is not detected, the methods repeats the direction indicating operation determination step S201 until the direction indicating operation is detected. In the vehicle position detection step S202, the vehicle position detection unit 108 detects a vehicle position. In the fuel-saving control stop condition determination step S203, the fuel-saving control stop condition determination unit 110 determines whether the fuel-saving control should be stopped based on the vehicle position and the map information when the direction indicating operation is detected. When it is determined that the fuel-saving control should be stopped, the method proceeds to the second fuel-saving control stop step S204, whereas when it is determined that the fuel-saving control should not be stopped, namely, when it is determined that the fuel-saving control should be continued, the method returns to the direction indicating operation determination step S201. Further, in the fuel-saving control stop condition determination step S203, it may be determined that the fuel-saving control should be stopped when turning right or left at an intersection, when passing on an expressway, or when joining on an expressway, and it may be determined that the fuel-saving control should not be stopped (the fuel-saving control should be continued) when changing a lane on a local road or when joining on a local road. In the second fuel-saving control stop step S204, the fuel-saving control unit 102 stops the fuel-saving control even if the surplus driving force does not become smaller than the threshold value, namely, even if the fuel-saving control is equal to or greater than the threshold value. Also, while the second fuel-saving control stop step S204 is being executed, the control loop of the basic fuel-saving control method M100 is stopped and the extended fuel-saving control method M200 is prioritized to be performed.

As described above, when it is expected that limiting the accelerating force of the vehicle needs to be cancelled, the fuel-saving control is stopped even if the surplus driving force does not become smaller than the threshold value, namely, even if the fuel-saving control is equal to or greater than the threshold value. Accordingly, when the fuel-saving control should not be stopped, the fuel-saving control is not unconditionally stopped (the fuel-saving control is continued) even if the direction indicating operation is detected, thereby improving the convenience and safety of the driver while maintaining the fuel-saving performance of the vehicle. In particular, in the case of the manual transmission vehicles, it is possible to push the driver to perform upshifting in advance by limiting an accelerating force of the vehicle. As a result, it is possible to greatly enhance the fuel-saving performance of the vehicle by executing the fuel-saving control.

This application is based on Japanese Patent Application No. 2016-200900 filed on Oct. 12, 2016, the entire contents of which are incorporated herein by reference.

INDUSTRIAL APPLICABILITY

The present disclosure has effects that when the fuel-saving control should not be stopped, the fuel-saving control is not unconditionally stopped even if a direction indicating operation is detected, thereby improving the convenience and safety of the driver while maintaining the fuel-saving performance of the vehicle, and is useful for a fuel-saving control device and a fuel-saving control method and the like.

REFERENCE SIGNS LIST

100: Fuel-saving control device
101: Surplus driving force calculation unit
102: Fuel-saving control unit
103: Controller
104: Accelerator position sensor
105: Instructed fuel injection amount calculation unit
106: Fuel injector
107: Direction indicating operation detection unit
108: Vehicle position detection unit
109: Map information storage unit
110: Fuel-saving control stop condition determination unit
111: Direction indicator
M100: Basic fuel-saving control method
S101: Surplus driving force calculation step
S102: Surplus driving force determination step
S103: Fuel-saving control execution step
S104: First fuel-saving control stop step
M200: Extended fuel-saving control method
S201: Direction indicating operation determination step
S202: Vehicle position detection step
S203: Fuel-saving control stop condition determination step
S204: Second fuel-saving control stop step

The invention claimed is:

1. A fuel-saving control device, comprising:
 a surplus driving force calculation unit for calculating a surplus driving force which is defined by a difference between a driving force of a driving wheel and a travelling resistance on a vehicle;
 a fuel-saving control unit configured to execute a fuel-saving control for lowering and correcting an instructed fuel injection amount depending on an accelerator position when the surplus driving force becomes equal to or greater than a threshold value, and configured to stop the fuel-saving control when the surplus driving force becomes smaller than the threshold value;
 a direction indicating operation detection unit for detecting a direction indicating operation;
 a vehicle position detection unit for detecting a vehicle position;
 a map information storage unit for storing map information; and
 a fuel-saving control stop condition determination unit for determining whether the fuel-saving control is stopped based on the vehicle position and the map information when the direction indicating operation is detected,
 wherein the fuel-saving control unit is configured to stop the fuel-saving control even if the surplus driving force does not become smaller than the threshold value, when the fuel-saving control stop condition determination unit determines that the fuel-saving control is stopped, and is configured not to stop the fuel-saving control when the fuel-saving control stop condition determination unit determines that the fuel-saving control is not stopped, and wherein the fuel-saving control stop condition determination unit is configured to determine that the fuel-saving control is not stopped when changing a lane on a local road or when joining on a local road.

2. The fuel-saving control device according to claim 1, wherein the fuel-saving control stop condition determination unit is configured to determine that the fuel-saving control is stopped when turning right or left at an intersection, when passing on an expressway, or when joining on an expressway.

3. A fuel-saving control method, comprising:
 a surplus driving force calculation step for calculating a surplus driving force which is defined by a difference between a driving force of a driving wheel and a travelling resistance on a vehicle;

a fuel-saving control execution step for executing a fuel-saving control for lowering and correcting an instructed fuel injection amount depending on an accelerator position when the surplus driving force becomes equal to or greater than a threshold value;

a fuel-saving control stop step for stopping the fuel-saving control when the surplus driving force becomes smaller than the threshold value;

a vehicle position detection step for detecting a vehicle position;

a fuel-saving control stop condition determination step for determining whether the fuel-saving control should be stopped based on the vehicle position and map information when a direction indicating operation is detected; and a second fuel-saving control stop step for stopping the fuel-saving control even if the surplus driving force does not become smaller than the threshold value, when it is determined that the fuel-saving control should be stopped in the fuel-saving control stop condition determination step, and for not stopping the fuel-saving control when it is determined that the fuel-saving control is not stopped in the fuel-saving control stop condition determination step, wherein in the fuel-saving control stop condition determination step, it is determined that the fuel-saving control is not stopped when changing a lane on a local road or when joining on a local road.

4. The fuel-saving control method according to claim 3, wherein in the fuel-saving control stop condition determination step, it is determined that the fuel-saving control is stopped when turning right or left at an intersection, when passing on an expressway, or when joining on an expressway.

\* \* \* \* \*